United States Patent
Seo (10) Patent No.: US 8,918,123 B2
(45) Date of Patent: Dec. 23, 2014

(54) METHOD AND APPARATUS FOR REDUCING STANDBY POWER

(75) Inventor: Jeongseok Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/614,048

(22) Filed: Sep. 13, 2012

(65) Prior Publication Data

US 2013/0109415 A1 May 2, 2013

(30) Foreign Application Priority Data

Oct. 28, 2011 (KR) .................. 10-2011-0110929

(51) Int. Cl.
*H04W 68/00* (2009.01)
*H04W 52/02* (2009.01)

(52) U.S. Cl.
CPC ............ *H04W 52/0251* (2013.01); *Y02B 60/50* (2013.01); *H04W 52/0283* (2013.01)
USPC ........................................................ 455/458

(58) Field of Classification Search
USPC ............ 455/558, 433, 466, 423, 41.1, 418, 7, 455/574, 11.1, 572, 422.1; 380/250; 370/311, 252
See application file for complete search history.

(56) References Cited

U.S. PATENT DOCUMENTS

| | | | |
|---|---|---|---|
| 2004/0235523 A1* | 11/2004 | Schrire et al. ................. | 455/558 |
| 2006/0003778 A1* | 1/2006 | Hogdahl et al. .............. | 455/466 |
| 2007/0207798 A1* | 9/2007 | Talozi et al. .................. | 455/423 |
| 2011/0195749 A1* | 8/2011 | Lan ............................... | 455/558 |
| 2011/0275369 A1* | 11/2011 | Bartlett et al. ................ | 455/433 |
| 2013/0017862 A1* | 1/2013 | Lee et al. ...................... | 455/558 |

* cited by examiner

*Primary Examiner* — Kiet Doan
(74) *Attorney, Agent, or Firm* — Jefferson IP Law, LLP (57) ABSTRACT

A method and a portable terminal for reducing standby power of a portable terminal which performs paging according to a set paging interval are provided. The method includes determining whether a Subscriber Identification Module (SIM) card polling interval arrives during a sleep mode of the portable terminal and synchronizing the SIM card polling interval with the set paging interval when the SIM card polling interval arrives.

15 Claims, 4 Drawing Sheets

METHOD AND APPARATUS FOR REDUCING STANDBY POWER

PRIORITY

This application claims the benefit under 35 U.S.C. §119(a) of a Korean patent application filed on Oct. 28, 2011 in the Korean Intellectual Property Office and assigned Serial No. 10-2011-0110929, the entire disclosure of which is hereby incorporated by reference.

BACKGROUND OF THE INVENTION

1. Field of the Invention

The present invention relates to a method and an apparatus for reducing standby power of a portable terminal. More particularly, the present invention relates to a method and an apparatus for reducing standby power of a portable terminal in which a paging interval is synchronized with a Subscriber Identification Module (SIM) card polling interval when the portable terminal enters into a sleep mode such that SIM card polling and paging channel monitoring are performed at the same time.

2. Description of the Related Art

Due to the rapid adoption of a portable terminal, the portable terminal has become ubiquitous in modern life. With the introduction of the smartphone variety of the portable terminal, the portable terminal can now provide not only a voice call service but also various data transmission services and additional services, thereby additionally serving as a multimedia communication device. Various methods are used to increase battery use time in accordance with the use of the portable terminal as a multimedia communication device.

When using the portable terminal, a typical state of the portable terminal a user encounters is an idle state of the portable terminal. Thus, the battery use time may be effectively increased by reducing standby power of the portable terminal. In particular, maintaining a sleep mode during the idle state is most effective.

Subscriber Identification Module (SIM) card polling, which identifies whether a SIM card is inserted, and paging channel monitoring, which monitors whether a paging channel is received, are performed when the portable terminal wakes up from the sleep mode. Therefore, the battery use time may be effectively increased by controlling a SIM card polling interval and a paging channel monitoring interval in the sleep mode of the portable terminal. However, in the technology of the related art, a frequency of the SIM card polling is controlled according to a service state of the portable terminal, which does not significantly reduce total current consumption.

Therefore, a need exists for a technique for reducing standby power of a portable terminal in a sleep mode that takes into consideration a paging interval and a SIM card polling interval.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for reducing standby power of a portable terminal in which a Subscriber Identification Module (SIM) polling interval is synchronized with a next paging interval when the portable terminal enters into a sleep mode such that SIM card polling and paging channel monitoring are performed at one time in the next paging interval, thereby reducing standby power.

In accordance with an aspect of the present invention, a method of reducing standby power of a portable terminal which performs paging according to a set paging interval is provided. The method includes determining whether a SIM card polling interval arrives during a sleep mode of the portable terminal, and synchronizing the SIM card polling interval with the set paging interval when the SIM card polling interval arrives.

In accordance with another aspect of the present invention, a portable terminal for performing paging according to a set paging interval is provided. The portable terminal includes a radio communication unit configured to communicate with a network to be allocated a paging channel, an input unit configured to receive an input from a user, a SIM card insertion unit to which a SIM card is able to be inserted, and a controller configured to determine whether a SIM card polling interval arrives during a sleep mode of the portable terminal and configured to control the SIM card polling interval to be synchronized with the set paging interval to perform the SIM card polling when the SIM card polling interval arrives.

In accordance with yet another aspect of the present invention, a method of reducing standby power of a portable terminal which performs paging according to a set paging interval is provided. The method includes synchronizing a SIM card polling interval with the set paging interval, determining whether the paging interval arrives, and performing the paging and the SIM card polling at the same time when a paging interval of the set paging interval arrives.

In accordance with still another aspect of the present invention, a portable terminal for performing paging according to a set paging interval is provided. The portable terminal includes a radio communication unit configured to communicate with a network to be allocated a paging channel, an input unit configured to receive an input from a user, a SIM card insertion unit to which a SIM card is able to be inserted, and a controller. The controller is configured to synchronize a SIM card polling interval with the set paging interval, configured to determine whether a paging interval arrives of the set paging interval, and configured to perform the paging and the SIM card polling at the same time when the paging interval arrives.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, the term "sleep mode" refers to a state in which power is not provided to peripheral devices of a portable terminal such as a Liquid Crystal Display (LCD) or only a minimum level of power is provided thereto in order to reduce power consumption when a user of the portable terminal does not use the portable terminal for a certain period of time and the portable terminal is in a standby state.

Herein, the term "paging" refers to allocating a paging channel to the portable terminal by a base station to be synchronized and to monitor a paging channel.

Herein, the term "paging interval" refers to a predetermined time interval for performing paging determined by a network connected to the portable terminal.

Herein, the term "Subscriber Identification Module (SIM) card polling interval" refers to sending a state identification command subsequently to each SIM card that is inserted to identify whether each SIM card is inserted.

Herein, the term "SIM card polling interval" refers to a predetermined interval for performing the SIM card polling by the portable terminal to identify whether the SIM card is inserted.

Figure 1:
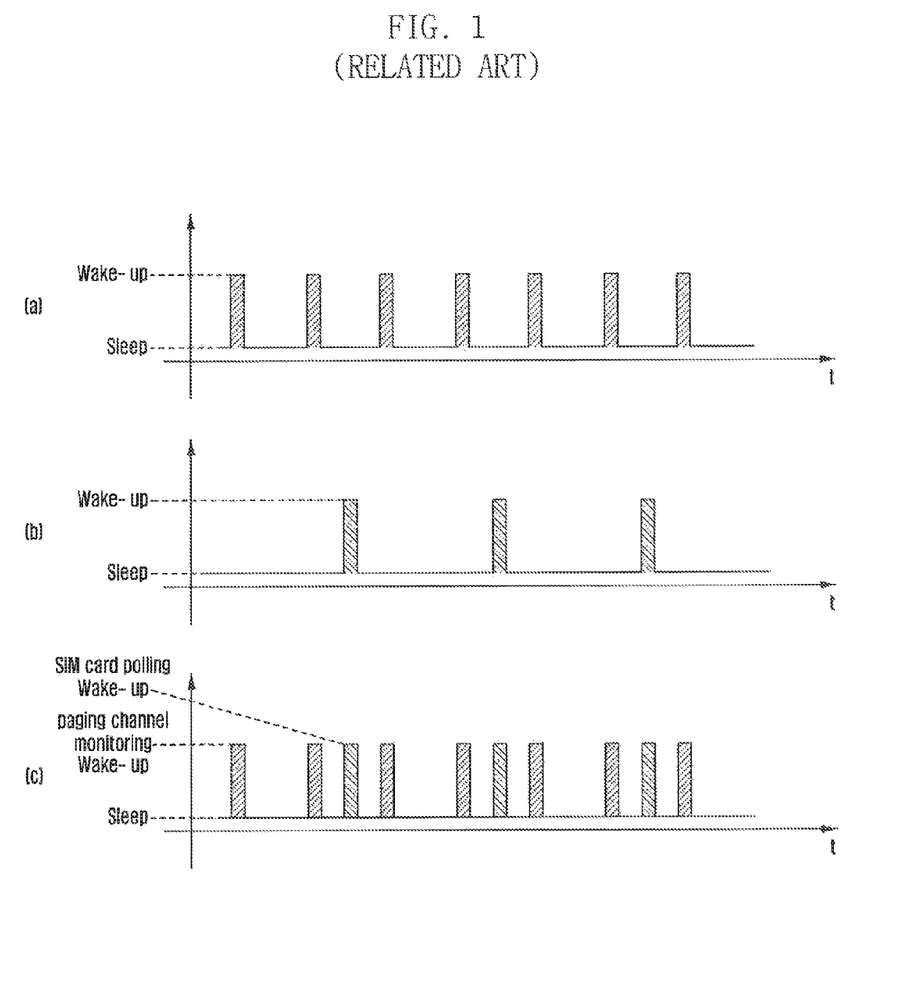
FIG. 1 includes views illustrating a wake up of a portable terminal in a sleep mode to monitor a paging channel and to perform Subscriber Identification Module (SIM) card polling according to the related art.

FIG. 1 includes views illustrating a wake up of a portable terminal in a sleep mode to monitor a paging channel and to perform SIM card polling according to the related art.

View (a) of FIG. 1 illustrates a wake up of a portable terminal in a sleep mode during a paging interval to monitor a paging channel. View (b) of FIG. 1 illustrates a wake up of a portable terminal in a sleep mode during a SIM card polling interval to perform SIM card polling.

According to a 3rd Generation Partnership Project (3GPP) definition, a portable terminal is allocated a paging channel to be synchronized to enable transmitting and receiving a message, such as a call, a channel allocation, or a command to/from a base station and monitors the paging channel at a predetermined period of time determined by a network.

Therefore, even when the portable terminal enters into a sleep mode, peripheral devices such as a baseband chip and a Digital Signal Processor (DSP) wake up from the sleep mode to monitor the paging channel. When the portable terminal wakes up from the sleep mode to monitor the paging channel, a current of about 100 to 150 mA is consumed during a time period of about 20 ms.

Also, in order to process an operation error, the portable terminal periodically monitors an insertion state of a SIM card after booting. In 3GPP Technical Standard (TS) 31.101, a polling signal is provided at every 30 second interval to monitor an insertion condition of the SIM card.

Therefore, even when the portable terminal enters into the sleep mode, peripheral devices such as the baseband chip and the Power Management Unit (PMU) wake up from the sleep mode to perform SIM card polling. Power consumption required for performing the SIM card polling when the portable terminal wakes up from the sleep mode is similar to power consumption required for monitoring the paging channel when the portable terminal wakes up from the sleep mode.

In the portable terminal, paging channel monitoring is a process used when communicating with the base station such as a call or message transmission and receipt. Also, the SIM card polling, which monitors whether a SIM card is mounted for authenticating the portable terminal, is an essential process. Therefore, the portable terminal needs to wake up in order to monitor the paging channel and to perform the SIM card polling in the sleep mode. Referring to views (a) and (b) of FIG. 1, it is shown that a paging interval is generally shorter than a SIM card polling interval.

View (c) of FIG. 1 illustrates a wake up of a portable terminal in a sleep mode during a paging interval and a SIM card polling interval to monitor a paging channel and to perform SIM card polling, respectively.

Referring to view (c) of FIG. 1, it can be seen that, when the portable terminal in the sleep mode monitors the paging channel or performs the SIM card polling, the portable terminal wakes up from the sleep mode each time. Therefore, in the sleep mode of the portable terminal, a battery use time may be effectively increased by controlling the SIM card polling interval and a paging channel monitoring interval in the sleep mode of the portable terminal. However, in the technology of the related art, a frequency of the SIM card polling is generally controlled according to a service state of the portable device such that a significant reduction in total current consumption is difficult to achieve.

Therefore, exemplary embodiments of the present invention are directed to address the above problem and provide a method and an apparatus capable of reducing standby power of the portable terminal by synchronizing the paging interval to the SIM card polling interval when the portable terminal enters into the sleep mode such that the SIM card polling and the paging channel monitoring may be performed at the same time.

Figure 2:
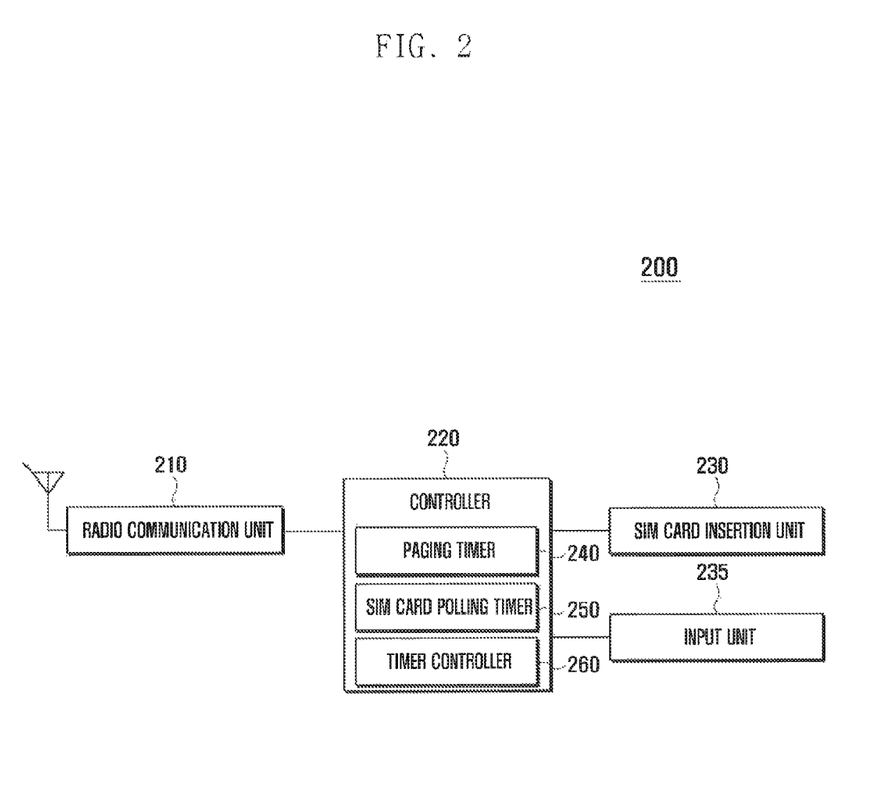
FIG. 2 includes a block diagram illustrating an internal configuration of a portable terminal according to an exemplary embodiment of the present invention.

FIG. 2 includes a block diagram illustrating an internal configuration of a portable terminal according to an exemplary embodiment of the present invention. The portable terminal according to an exemplary embodiment of the present invention includes a radio communication unit 210, a controller 220, a SIM card insertion unit 230, and an input unit 235. Also, the controller 220 according to an exemplary embodiment of the present invention includes a paging timer 240, a SIM card polling timer 250, and a timer controller 260.

The radio communication unit 210 performs a function to transmit and receive a corresponding data for performing radio communication of the portable terminal 200. The radio communication unit 210 may include a Radio Frequency (RF) transmitter for performing frequency up-conversion and amplification of a signal to be transmitted and an RF receiver for performing low noise amplification and frequency down-conversion of a received signal. Also, the radio communication unit 210 may receive data through a wireless channel to be output to the controller 220 and transmit data output from the controller 220 through the wireless channel.

The wireless communication unit 210 according to an exemplary embodiment of the present invention may transmit and receive a radio signal for allocating the paging channel to the portable terminal 200 to be synchronized, thereby enabling the portable terminal 200 to transmit and receive a message, such as a call, a channel allocation, or a command to/from a base station (not shown). In this case, the wireless communication unit 210 according to an exemplary embodiment of the present invention is allocated a paging channel to be synchronized to enable transmitting and receiving a message, such as a call, a channel allocation, or a command to/from a base station (not shown). Also, when the portable terminal 200 is synchronized with the base station (not shown), the wireless communication unit 210 may transmit and receive a radio signal for monitoring the paging channel at a predetermined period of time determined by the network.

The SIM card insertion unit 230 is a portion of the portable terminal 200 to which the SIM card is inserted and coupled to. The SIM card, which is a card that stores various user information, includes a microprocessor and a memory chip and is formed to be attachable and detachable to/from the SIM card insertion unit 230 of the portable terminal 200. The SIM card insertion unit 230 may be provided in plural.

When the SIM card is not mounted to the SIM card insertion unit 230, a main service such as a call or a text messaging cannot be provided. Therefore, according to an exemplary embodiment of the present invention, the controller 220 performs the SIM card polling to identify whether the SIM card is inserted to the SIM card insertion unit 230 at a predetermined interval.

The input unit 235 receives a user's key manipulation signal for controlling the portable terminal and transmits the user's key manipulation signal to the controller 220. The input unit 235 may be formed as a keypad such as a 3*4 keyboard or QWERTY keyboard including a number key, a character key, and an arrow key, and may be formed as a touch pad.

According to user input, the input unit 235 generates an input signal for performing functions such as a call function or functions of an application including a video or music playback function, an image display function, a broadcast playback function, a camera photograph function, an audio record function, a calculator, or scheduler of the portable terminal 200 and transmits the input signal to the controller 220. According to an exemplary embodiment of the present invention, the portable terminal 200 enters into the sleep mode when user enters no input during a given time.

The controller 220 controls an overall operation of the portable terminal 200 and a signal flow between internal blocks of the portable terminal 200. The controller 220 according to an exemplary embodiment of the present invention includes the paging timer 240 for setting the paging interval, the SIM card polling timer 250 for setting the SIM card polling interval, and the timer controller 260 for controlling the paging timer 240 and the SIM card polling timer 250.

First, when power is applied to the portable terminal 200, the controller 220 detects this and controls the radio communication unit 210 to communicate with the base station. When a communication is established with the base station, the controller 220 controls the radio communication unit 210 to be allocated the paging channel for transmitting and receiving a message, such as a call, a channel allocation, or a command to/from the base station. The controller 220 acquires the paging interval through the allocated paging channel.

The timer controller 260 sets the paging timer 240 according to the acquired paging interval. When a set period of time elapses after the paging timer 240 starts running, the paging timer 240 stops running and the paging interval arrives. When the paging timer 240 stops and the paging interval arrives, the controller 220 controls the radio communication unit 210 to monitor the paging channel. When it is determined that a paging signal from the base station is received, the controller 220 controls the radio communication unit 210 to communicate with the base station. When it is determined that the paging signal from the base station is not received, the time controller 260 controls the paging timer 240 to start anew.

The timer controller 260 also sets the SIM card polling timer 250 according to the SIM card polling interval. The SIM card polling interval is set by the portable terminal itself. In the 3GPP TS 31.101, the insertion state of the SIM card is monitored by transmitting the polling signal at every 30 second interval. When the SIM card polling timer 250 starts running and a set period of time elapses, the SIM card polling timer 250 stops and the SIM card polling interval arrives. When the polling timer 250 stops and the paging interval arrives, the controller 220 transmits the polling signal to the SIM card insertion unit 230 to identify the insertion state of the SIM card.

When it is determined that the SIM card is not inserted according to a result of performing the SIM card polling, the controller 220 controls the portable terminal 200 to display an error signal to the user. Various methods can be used to display the error signal. For example, a particular alarm sound may be outputted through a speaker (not shown) and may display an error message through a display screen (not shown) of the portable terminal 200. When the controller 220 determines that the SIM card is properly inserted, the timer controller 260 controls the SIM card polling timer 250 to start anew.

Also, the controller 220 determines whether an input from the user is received through the input unit 235 during a predetermined period of time. When it is determined that the user input is received, the controller 220 performs a corresponding function. When it is determined that the user input is not received, the controller 220 enters into the sleep mode.

A time period set for entering into the sleep mode may be received from the user through the input unit 235 or, when no user input is received, a default time set in the portable terminal 200 may be used.

Also, the controller 220 determines whether the paging timer 240 stops running and the paging interval arrives. When it is determined that the paging interval arrives, the controller 220 cancels the sleep mode and controls the radio communication unit 210 to monitor the paging channel. When the controller 220 determines that the paging signal from the base station is received, the controller 220 controls the radio communication unit 210 to communicate with the base station. When the controller 220 determines that the paging signal is not received, the controller 220 again enters into the sleep mode and the timer controller 260 controls the paging timer 240 to start anew.

To the contrary, when the controller 220 determines that the paging interval does not arrive, the controller 220 maintains the sleep mode.

Also, independently of a process of determining whether the paging interval arrives, the controller 220 determines whether the SIM card polling timer 250 stops running and the SIM card polling interval arrives. When it is determined that the SIM card polling interval arrives, the controller 220 determines whether the SIM card polling interval and the paging interval arrive at the same time. When it is determined that the SIM card polling interval and the paging interval do not arrive at the same time, the controller 220 stands by until the arrival of a next paging interval that arrives first after the arrival of the SIM card polling interval and determines whether the next paging interval arrives. When it is determined that the next paging interval arrives, the controller 220 performs the SIM card polling.

To the contrary, when it is determined that the SIM card polling interval and the paging interval arrive at the same time, the controller 220 immediately performs the SIM card polling.

The portable terminal may include a plurality of SIM card insertion units 230. When a start time point of the SIM card polling interval is not the same for each of the plurality of the SIM card insertion units 230, the sleep mode needs to be canceled each time the SIM card polling is performed for each of the SIM card insertion units 230 even if the SIM card insertion units 230 have the same SIM card polling interval.

According to an exemplary embodiment of the present invention, after performing the SIM card polling for one SIM card insertion unit 230, the controller controls to synchronize the polling interval of remaining SIM card insertion units 230 other than the SIM card insertion unit 230 for which SIM card polling is performed with the polling interval of the SIM card insertion unit 230 for which SIM card polling is performed. Through this process, the SIM card polling may be performed with respect to the plurality of the SIM card insertion units 230 at one time instead of canceling the sleep mode each time the polling is performed with respect to the plurality of the SIM card insertion units 230.

In any circumstance, the paging interval arrives at the time point of performing the SIM card polling such that the controller 220 is released from the sleep mode. Therefore, the controller 220 may perform the SIM card polling and the paging channel monitoring at one time instead of canceling the sleep mode at each paging interval or SIM card polling interval, thereby reducing the standby power.

Meanwhile, when the controller 220 determines that the next paging interval does not arrive, the controller 220 stands by until the next paging interval arrives.

When the controller 220 stands by until the next paging interval, the controller 220 may determine a standby period by calculating a residual time between an arrival time point of the SIM card polling interval and an arrival time point of the next paging interval, which arrives first after the arrival of the SIM card polling interval. Also, when determining whether the next paging interval arrives, the standby period calculated as described above may be added to the SIM card polling interval to determine whether the next paging interval arrives. The timer controller 260 may synchronize the SIM card polling interval with the paging interval by setting the SIM card polling timer 250 according to the calculated standby time period.

When it is determined that the SIM card is not inserted according to the result of performing the SIM card polling, the controller 220 controls the portable terminal 200 to display the error signal to the user. Various methods can be used to display the error signal. For example, a particular alarm sound may be output through the speaker (not shown) and an error message may be displayed through the display screen (not shown) of the portable terminal 200. When the controller 220 determines that the SIM card is properly inserted, the controller 260 controls the SIM card polling timer 250 to start anew.

Meanwhile, when the controller 220 determines that the SIM card polling interval does not arrive, the controller 220 maintains the sleep mode.

Figure 3:
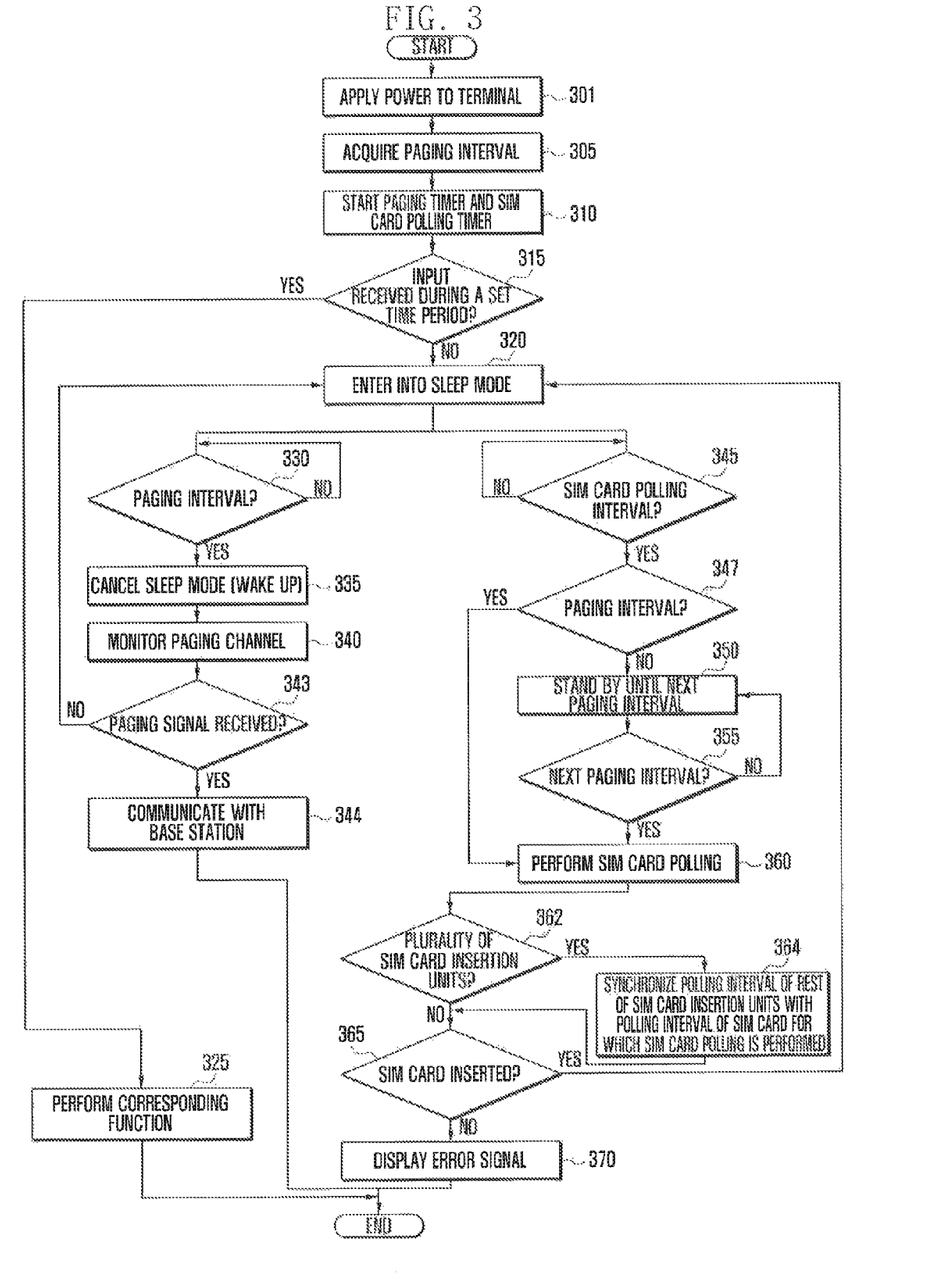
FIG. 3 includes a flowchart illustrating a method of reducing power consumption according to an exemplary embodiment of the present invention.

FIG. 3 includes a flowchart illustrating a method of reducing power consumption according to an exemplary embodiment of the present invention.

When power is applied to the portable terminal 200, the controller 220 detects this in step 301. Next, the controller 220 controls the radio communication unit 210 to communicate with the base station. When the communication is established with the base station, the controller 220 controls the radio communication unit 210 to be allocated a paging channel for transmitting and receiving a message, such as a call, a channel allocation, or a command between the portable terminal 200 and the base station. After being allocated the paging channel, the controller 220 acquires the paging interval through the allocated paging channel in step 305.

The timer controller 260 starts the paging timer 240 and the SIM card polling timer 250 in step 310. Specifically, the timer controller 260 sets the paging timer 240 according to the acquired paging interval. When the paging timer 240 starts running and a set period of time elapses, the paging timer 240 stops and the paging interval arrives. When the paging timer 240 stops and the paging interval arrives, the controller 220 controls the radio communication unit 210 to monitor the paging channel. When it is determined that the paging signal from the base station is received, the controller 220 controls the radio communication unit 210 to communicate with the base station. When it is determined that the paging signal from the base station is not received, the timer controller 260 controls the paging timer 240 to start anew.

The timer controller 260 also sets the SIM card polling timer 250 according to the SIM card polling interval. The SIM card polling interval is set by the portable terminal itself. In 3GPP TS 31.101, insertion of the SIM card is monitored by transmitting the polling signal at every 30 second interval. When the SIM card polling timer 250 starts running and a set period of time elapses, the SIM card polling timer 250 stops and the SIM card polling interval arrives. When the polling timer 250 stops and the paging interval arrives, the controller 220 transmits the polling signal to the SIM card insertion unit 230 to identify the insertion state of the SIM card.

When it is determined that the SIM card is not inserted according to a result of performing the SIM card polling, the controller 220 controls the portable terminal 200 to display the error signal to the user. Various methods can be used to display the error signal. For example, a particular alarm sound may be output through the speaker (not shown) and may display the error message through the display screen (not shown) of the portable terminal 200. When the controller 220 determines that the SIM card is properly inserted, the timer controller 260 controls the SIM card polling timer 250 to start anew.

After starting the paging timer 240 and the SIM card polling timer 250, the controller 220 determines whether an input from the user is received through the input unit 235 during a predetermined period of time in step 315. When it is determined that the user input is received, the controller 220 proceeds to step 325 to perform a corresponding function. When it is determined that the user input is not received, the controller 220 enters into the sleep mode in step 320.

A time period set for entering into the sleep mode may be received from the user through the input unit 235 or, when no user input is received, a default time set in the portable terminal 200 may be used.

When the controller 220 enters into the sleep mode, the controller 220 determines whether the paging timer 240 stops and the paging interval arrives in step 330. When it is determined that the paging interval arrives, the controller 220 cancels the sleep mode in step 335 and then controls the radio communication unit 210 to monitor the paging channel in step 340.

The controller 220 monitors the paging channel to determine whether the paging signal is received in step 343. When the paging signal is received from the base station, the controller 220 controls the radio communication unit 210 to communicate with the base station in step 344. When it is determined that no paging signal is received, the timer controller 260 returns to step 320 to enter into the sleep mode again and the timer controller 260 controls the paging timer 240 to start anew.

To the contrary, when the controller 220 determines that the paging interval does not arrive, the controller 220 maintains the sleep mode.

Independently of step 330, the controller 220 determines whether the SIM card polling timer 250 stops and the SIM card polling interval arrives in step 345. When it is determined that the SIM card polling interval arrives, the controller 220 determines whether the SIM card polling interval and the paging interval arrive at the same time in step 347. When it is determines that the paging interval does not arrive, the controller 220 stands by until the arrival of the next paging interval, which arrives first after the SIM card polling interval in step 350, and determines whether the next paging interval arrives in step 355. When it is determined that the next paging interval arrives, the controller 220 performs the SIM card polling in step 360.

To the contrary, when it is determined that the SIM card polling interval and the paging interval arrive at the same time in step 347, the controller 220 immediately performs the SIM card polling in step 360.

In step 360, the paging interval arrives such that the controller 220 is released from the sleep mode. Therefore, the controller 220 may perform the SIM card polling and the paging channel monitoring at the same time instead of canceling the sleep mode at each paging interval or SIM card polling interval, thereby reducing the standby power.

Meanwhile, when the controller 220 determines that the next paging interval does not arrive, the controller 220 returns to step 350 to stand by until the next paging interval.

When the controller 220 stands by until the next paging interval, the controller 220 may determine a standby period by calculating a residual time between an arrival time point of the SIM card polling interval and an arrival time point of the next paging interval, which arrives first after the arrival of the SIM card polling interval. Also, when determining whether the next paging interval arrives, the standby period calculated as described above may be added to the SIM card polling interval to determine whether the next paging interval arrives. The timer controller 260 may synchronize the SIM card polling interval with the paging interval by setting the SIM card polling timer 250 according to the calculated standby time period.

The controller 220 proceeds to step 362 after performing the SIM card polling. The controller 220 determines whether the portable terminal 200 includes a plurality of the SIM card insertion units 230 in step 362. When the portable terminal 200 includes the plurality of the SIM card insertion units 230, the controller 220 controls such that the polling interval of the SIM card insertion units 230 other than the SIM card insertion unit 230 for which the SIM card polling is performed is synchronized with the polling interval of the SIM card insertion unit 230 for which the SIM card polling is performed in step 364. Through this process, the SIM card polling may be performed with respect to the plurality of the SIM card insertion units 230 at one time instead of canceling the sleep mode each time the polling is performed with respect to the plurality of the SIM card insertion units 230. Next, the controller 220 proceeds to step 365.

When the controller 220 determines that the portable terminal 200 does not include a plurality of the SIM card insertion units 230 at step 362, the controller 220 immediately proceeds to step 365.

The controller 220 determines whether the SIM card is inserted according to a result of the SIM card polling in step 365. When it is determined that the SIM card is not inserted, the controller 220 controls the portable terminal 200 to display the error signal to the user in step 370. Various methods can be used to display the error signal. For example, a particular alarm sound may be outputted through the speaker (not shown) and may display the error message through a display screen (not shown) of the portable terminal 200. When the controller 220 determines that the SIM card is properly inserted, it returns to step 320 to enter again into a sleep mode, and the timer controller 260 controls the SIM card polling timer 250 to start anew.

Meanwhile, when it is determined that the paging interval does not arrive in step 345, the controller 220 maintains the sleep mode.

Figure 4:
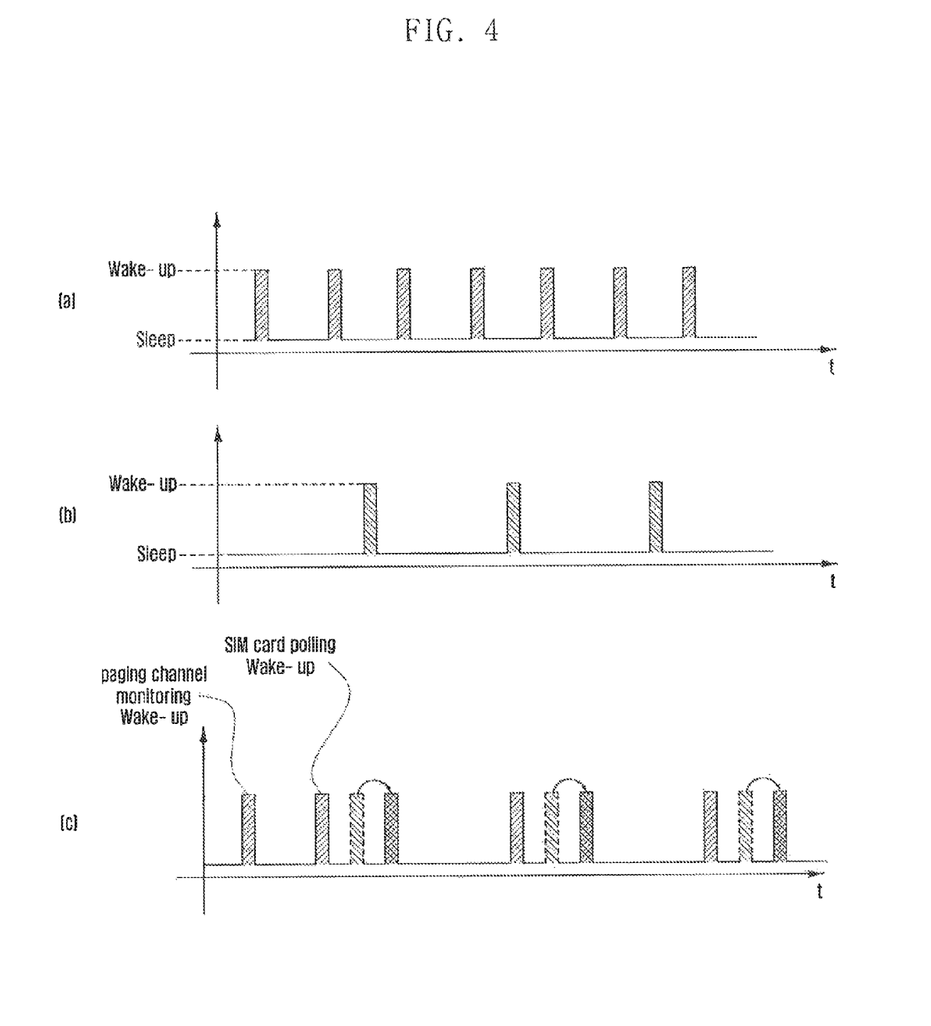
FIG. 4 includes views illustrating a wake up of a portable terminal in a sleep mode to monitor a paging channel and to perform SIM card polling according to an exemplary embodiment of the present invention.

FIG. 4 includes views illustrating a wake up of a portable terminal in a sleep mode to monitor a paging channel and to perform SIM card polling according to an exemplary embodiment of the present invention.

View (a) of FIG. 4 illustrates a wake up of a portable terminal in a sleep mode during a paging interval to monitor a paging channel. View (b) of FIG. 4 illustrates a wake up of a portable terminal in a sleep mode during a SIM card polling interval to perform SIM card polling. Views (a) and (b) of FIG. 4 are substantially the same as views (a) and (b) of FIG. 1 and thus a description thereof is omitted herein for brevity.

Referring to view (c) of FIG. 4, it is shown that a time point at which the controller 220 wakes up from the sleep mode for SIM card polling is delayed until a time point at which the controller 220 wakes up from the sleep mode for a next paging channel monitoring, thereby reducing a frequency at which the controller 220 wakes up from the sleep mode. This becomes clearer when comparing view (c) of FIG. 4 to view (c) of FIG. 1.

In view (c) of FIG. 1 and view (c) of FIG. 4, the paging channel monitoring is performed seven times and the SIM card polling is performed three times. However, when comparing a frequency at which the sleep mode is canceled to monitor the paging channel or to perform the SIM card polling, the controller 220 wakes up ten times in total in view (c) of FIG. 1 because the sleep mode needs to be cancelled respectively at the paging interval and the SIM card polling interval for the paging channel monitoring and the SIM card polling. However, in view (c) of FIG. 4, the SIM card polling and the paging channel monitoring are performed at the same time, and thus, the sleep mode is cancelled only seven times.

Thus, by controlling the SIM card polling interval to conform to the paging interval, the SIM card polling and the paging channel monitoring are performed at the same time in the next paging interval, thereby reducing standby power.

According to the exemplary embodiments of the present invention, a method and an apparatus for reducing standby power of the portable terminal may be provided in which the standby power may be reduced by synchronizing the paging interval with the polling interval when the portable terminal enters into the sleep mode such that the SIM card polling and the paging channel monitoring are performed at the same time.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of reducing standby power of a portable terminal which performs paging according to a set paging interval, the method comprising:
    determining whether the portable terminal is in a sleep mode;
    identifying a Subscriber Identification Module (SIM) card polling interval;
    identifying the set paging interval for performing paging determined by a network connected to the portable terminal; and
    synchronizing the SIM card polling interval with the identified set paging interval, wherein the SIM card polling interval is for sending a state identification command to the SIM card,
    wherein the synchronizing comprises standing by until an arrival of a next paging interval that arrives first after an arrival of the SIM card polling interval.

2. The method of claim 1, further comprising:
    determining whether a paging interval of the set paging interval arrives; and
    performing the paging and the SIM card polling at the same time when the paging interval of the set paging interval arrives.

3. The method of claim 2, further comprising:
    restarting the SIM card polling interval after performing the SIM card polling.

4. The method of claim 1, when the portable terminal includes a plurality of SIM card insertion units, further comprising:
    synchronizing, after performing the SIM card polling, a polling interval of at least one SIM card insertion unit of the plurality of the SIM card insertion units other than the SIM card insertion unit for which the SIM card polling is performed with the polling interval of the SIM card insertion unit for which the SIM card polling is performed.

5. A portable terminal for performing paging according to a set paging interval, the portable terminal comprising:
    a radio communication unit configured to communicate with a network to be allocated a paging channel;
    an input unit configured to receive an input from a user;
    a Subscriber Identification Module (SIM) card insertion unit to which a SIM card is able to be inserted; and
    a controller configured to determine whether the portable terminal is in a sleep mode, to identify a SIM card polling interval, to identify the set paging interval for performing paging determined by the network, and to synchronize the SIM card polling interval with the identified set paging interval,
    wherein the SIM card polling interval is for sending a state identification command to the SIM card, and
    wherein, in the synchronizing, the controller is configured to stand by until an arrival of a next paging interval that arrives first after an arrival of the SIM card polling interval.

6. The portable terminal of claim 5, wherein, the controller determines whether a paging interval of the set paging interval arrives and controls to perform the paging and SIM card polling at the same time when the paging interval of the set paging interval arrives.

7. The portable terminal of claim 6, wherein the controller controls to restart the SIM card polling interval after performing the SIM card polling.

8. The portable terminal of claim 5, wherein the controller comprises:
    a paging timer configured to set the paging interval;
    a SIM card polling timer configured to set the SIM card polling interval; and
    a timer controller configured to control the paging timer and the SIM card polling timer.

9. The portable terminal of claim 5, wherein, when the portable terminal includes a plurality of SIM card insertion units, the controller synchronizes, after performing the SIM card polling, a polling interval of at least one SIM card insertion unit of the plurality of the SIM card insertion units other than the SIM card insertion unit for which the SIM card polling is performed with the polling interval of the SIM card insertion unit for which the SIM card polling is performed.

10. A method of reducing standby power of a portable terminal which performs paging according to a set paging interval, the method comprising:
    synchronizing a Subscriber Identification Module (SIM) card polling interval with the set paging interval;
    determining whether a paging interval of the set paging interval arrives; and
    performing the paging and the SIM card polling at the same time when the paging interval arrives,
    wherein the SIM card polling interval is for sending a state identification command to the SIM card, and
    wherein the synchronizing includes:
        determining whether the SIM card polling interval arrives;
        standing by until an arrival of a next paging interval that arrives first after the arrival of the SIM card polling interval; and
        synchronizing the SIM card polling interval with the set paging interval.

11. The method of claim 10, wherein, when the portable terminal includes a plurality of SIM card insertion units, the polling interval of all of the plurality of SIM card insertion units are synchronized.

12. The method of claim 10, wherein the determining of whether the paging interval of the set paging interval arrives and the performing of the paging and the SIM card polling at the same time occurs during a sleep mode of the portable terminal.

13. A portable terminal for performing paging according to a set paging interval, the portable terminal comprising:
    a radio communication unit configured to communicate with a network to be allocated a paging channel;
    an input unit configured to receive an input from a user;
    a Subscriber Identification Module (SIM) card insertion unit to which a SIM card is able to be inserted; and
    a controller configured to synchronize a SIM card polling interval with the set paging interval, configured to determine whether a paging interval arrives of the set paging interval, and configured to perform the paging and the SIM card polling at the same time when the paging interval arrives, wherein the SIM card polling interval is for sending a state identification command to the SIM card, and wherein the controller, when synchronizing, is configured to determine whether the SIM card polling interval arrives, to stand by until an arrival of a next paging interval that arrives first after the arrival of the SIM card polling interval, and to synchronize the SIM card polling interval with the set paging interval.

14. The portable terminal of claim 13, wherein, when the portable terminal includes a plurality of SIM card insertion units, the controller is configured to synchronize the polling interval of all of the plurality of SIM card insertion units.

15. The portable terminal of claim 13, wherein the controller determines whether the paging interval of the set paging interval arrives and performs the paging and the SIM card polling at the same time during a sleep mode of the portable terminal.

* * * * *